United States Patent Office 3,331,698
Patented July 18, 1967

3,331,698
PROCESS FOR CONVERTING WATER SOLUBLE PRODUCTS INTO WATER RESISTANT MATERIALS
Alan R. Mills, Oakland, Calif., assignor to Shell Oil Company, New York, N.Y., a corporation of Delaware
No Drawing. Filed Aug. 24, 1964, Ser. No. 391,767
13 Claims. (Cl. 106—214)

This invention relates to a process for converting water-soluble materials into water-resistant materials. More particularly, the invention relates to a process for converting hydroxy-containing water-soluble materials, such as starch, into water-resistant materials, and to the use of the process for preparing new paper coating and/or sizing compositions, adhesives and the like.

Specifically, the invention provides a new and highly efficient process for converting water-soluble hydroxy-containing materials, and particularly starch and starch derivatives, into water-resistant materials which comprises contacting and reacting the hydroxy-containing materials with a methylolated ureidopyrimidone as described hereinafter, preferably under alkaline conditions.

As a special embodiment, the invention provides a process for applying a water-resistant coating and/or size to paper which comprises forming an aqueous solution containing starch and the above-described methylolated ureidopyrimidone, and preferably a clay filler, and then applying this mixture, preferably at alkaline pH, to paper as by dipping or pressing techniques, and then drying the treated paper.

Polyhydroxy-containing materials, such as starch, have been used in the textile and paper industries for many purposes. Thus, starch has been used as a coating (to improve printing and writing qualities) or size for paper, and as an adhesive for products such as corrugated paperboard or as laminated fiber board. Starch has not been entirely satisfactory for these purposes, however, as the resulting sizings, coatings and adhesives have been soluble in water. Resorcinolformaldehyde and urea-formaldehyde resins have been used to improve water resistance of the starch compositions but their useful application is limited to acidic conditions and limited shelf life.

It is an object of the invention, therefore, to provide a new process for converting water-soluble materials and particularly hydroxy-containing materials such as starch to water-resistant materials. It is a further object to provide water-resistant starch compositions which have good solution stability and color. It is a further object to provide a process for imparting water-insolubilization to starch adhesives which is effective over a wide pH range (1 to 11). It is a further object to provide new insolubilizing agents for starch coatings which do not adversely affect viscosity of the treating solution. It is a further object to provide starch compositions which cure to form water-insoluble products. It is a further object to provide a new and efficient process for preparing water-insoluble starch coatings for paper and the like. It is a further object to provide a process for preparing water-insoluble sizings for paper and textiles. It is a further object to provide a new process for preparing water-resistant starch adhesives. It is a further object to provide a process for bonding surfaces with a water-resistant starch containing adhesive. It is a further object to provide a process for preparing laminated fiber board and corrugated paper board. It is a further object to provide paper products containing a water-resistant starch composition. These and other objects of the invention will be apparent from the following detailed description thereof.

It has now been discovered that these and other objects may be accomplished by the process of the invention comprising contacting and reacting the hydroxy-containing materials with a methylolated ureidopyrimidone as described hereinafter, preferably under alkaline conditions. It has been surprisingly found that this process permits one to convert relatively inexpensive water-soluble materials such as starch and starch derivatives to products having a high resistance to water. These new treating compositions are surprisingly effective over a wide pH range (e.g., 1 to 11). In addition, there is no adverse effect on viscosity at the preferred alkaline pH range as in the case of some insolubilizing agents. Further, the new compositions also have excellent adhesion, particularly to cellulosic materials. The process is thus ideally usited for use in the preparation of water-resistant starch adhesives, water-resistant coatings and sizings for paper and textiles and the like. The process is particularly effective for use in making coatings for application to paper to improve writing and printing qualities.

The water-soluble materials to be converted to water-insoluble products according to the process of the invention may be any polyhydroxy-containing water-soluble material, such as polyvinyl alcohols, hydrolyzed polyvinyl acetates, and the like, and particularly starches and starch derivatives. The expression "starch" as used herein includes any of the familiar soft, white amorphous powders which are obtained from many different types of plant cells which are carbohydrates and polysaccharides. The expression "starch' 'also includes modified starches, such as the products obtained by treating starch with oxidizing or chlorinating agents, with cyanoethylating agents, with acetylating agents, and the like. The term also includes dextrinized starches. The starch particles may be swelled or unswelled, i.e., they may have been subjected to treatments such as with boiling water to hydrate the starch and cause the granules to expand or burst.

Examples of such materials include, among others, cereal starches, corn starch, rice starch, wheat starch, potato starch, tapioca starch, root starches, lignocellulose materials as hemp hurd flour, wood flour, boiled corncob fiber, corncob flour, hypochlorite-oxidized starch, starch converted with enzymes, hydroxy-ethylated starch, cyanoethylated starch and the like.

The compounds to be reacted with the above-described water-soluble hydroxy-containing materials include the methylolated ureidopyrimidones. These may be represented by the following formula:

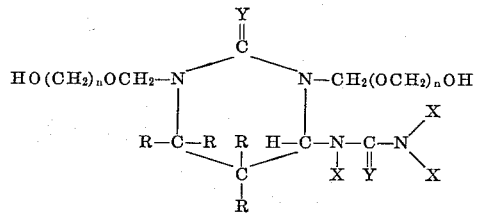

wherein $n$ is 0 to 5, Y is oxygen or sulfur, R is hydrogen or an alkyl radical and X is hydrogen, alkyl or alkylol group.

Examples of the above-described methylolated ureidopyrimidones include, among others, 1,3-dimethylol-4-ureido-6-methyl-tetrahydro-2-pyrimidone, 1,3 - dimethylol-4-ureido-tetrahydro-2-pyrimidone, 1,3-dimethylol-4-ureido-6-butyl-tetrahydro-2-pyrimidone, 1,3-dimethylol-4(N,N'-dimethylolureido)-tetrahydro-2-pyrimidone, 1,3-dimethylol-4-uredio-6-methyltetrahydro-2-thiopyrimidone, 1,3-dimethylol-4-thioureido - 6 - isopropyl-tetrahydro-2-pyrimidone, 1,3-dimethylol-4-ureido-6-phenyl-tetrahydro - 2-pyrimidone, 1,3-dimethylol-4-ureido-5,6 - dimethyl-tetrahydro-2-pyrimidone, 1,3-dimethylol - 4(N,N'-dimethylolureido)-6-methyl-tetrahydro-2-pyrimidone, 1,3-dimethylol-4-(N,N'-dimethylolthioureido) - 6-cyclohexyl-tetrahydro-2-pyrimidone.

These compounds are preferably prepared by reacting urea or thiourea with the desired unsaturated aldehydes, such as acrolein, crotonaldehyde, alpha-methylacrolein, alpha-phenylacrolein and the like, and then reacting the resulting product with formaldehyde. The reaction of the urea with the unsaturated aldehyde is preferably accomplished in an acidic aqueous medium. Preferred pH range is from 3 to 5. This is accomplished by the addition of acids, such as phosphoric acid, sulfuric acid, acetic acid and the like. The amount of the urea and the unsaturated aldehyde may vary over a wide range. Preferred amounts vary from about 0.5 to 1.5 moles of the aldehyde per mole of the urea. Particularly preferred amounts of reactants vary from 0.5 to 0.7 mole of aldehyde per mole of urea. This reaction is preferably accomplished at temperatures ranging from about 0° C. to 50° C.

The reaction of the condensate with formaldehyde is accomplished in the presence of an acid medium or basic medium, but preferably in an acid medium. This may be done by retaining the condensate in the same reaction medium and adding the amount of formaldehyde desired. Preferred amounts of aldehyde vary from about 1 to 5 moles of formaldehyde per mole of the condensate. Especially preferred amounts of formaldehyde vary from about 2 to 4.5 moles per mole of condensate. This reaction is preferably accomplished at temperatures ranging from about 75° C. to 85° C.

The methylolated products can be used in the aqueous medium in which they are formed or they may be recovered in pure form by evaporation, distillation and the like.

The preparation of the methylolated ureidopyrimidones by the above process is illustrated below:

*1,3-dimethylol-4-ureido-tetrahydro-2-pyrimidone* (A)

2 moles of urea was combined with 1 mole of acrolein and the mixture adjusted to pH of 4 by the addition of phosphoric acid. The mixure was then kept at 45° C. until the reaction was complete.

4.5 moles of formaldehyde was then added to the above mixture as 37% formalin solution. The pH was adjusted to 5–5.5 and the mixture heated to 80 to 90° C. for about 4 hours. The mixture was then stripped of excess formaldehyde, leaving a thick viscous liquid identified as a methylolated ureidopyrimidone. The product at 50% solids contained about 10.5% nitrogen and had a Brookfield viscosity at 20° C. of 2.56 poises.

*1,3-dimethylol-4-ureido-6-methyl-tetrahydro-2-pyrimidone* (B)

2 moles of urea was combined with 1 mole of crotonaldehyde and the mixture adjusted to pH 4 by the addition of acetic acid. This mixture was kept at 45° C. until the reaction was complete.

4.5 moles of formaldehyde was then added to the above mixture of paraformaldehyde or 37% formalin solution. The pH was adjusted to 5.5 and the mixture heated to 80 to 90° C. for about four hours. The mixture was then stripped of excess formaldehyde, leaving a thick viscous liquid identified as a methylolated methyl unreidopyrimidone. The product at 70% solids contained 9.7% nitrogen and had a Brookfield viscosity at 20° C. of 120 poises.

The process of the invention is effected by combining the above-described water-soluble hydroxy-containing material with the above-described methylolated ureidopyrimidone, preferably under alkaline conditions.

The reaction can be effected in any type of medium such as water, alcohol, and the like. It is preferably accomplished in an aqueous medium. In the case of starch, the composition is preferably formed by making an aqueous dispersion of the starch in water by stirring and/or heating, and then adding the methylolated ureidopyrimidone to this aqueous suspension.

While the amount of the starch employed may vary over a wide range, it is generally preferred to utilize a minimum amount needed to form a suitable uniform dispersion. In the case of starch and starch derivatives, for example, it is preferred to use from 1% to 40% solutions of the starch. Particularly superior results are obtained when the concentration of starch varies from 5% to about 25% by weight.

The amount of the methylolated ureidopyrimidones to be employed may also vary over a considerable range, but it is preferred for economic reasons to use only the minimum amount required for imparting the desired water resistance. In general, amounts of methylolated ureidopyrimidone will vary from about 0.01% to about 15% by weight of the water-soluble material. In the case of starch, it is generally preferred to employ from 2% to 15% by weight of the starch of the ureidopyrimidone.

It is desirable to have the solution of the mixture at a pH which is neutral or preferably alkaline. Particularly superior results are obtained when the pH is between 5 and 9, and still more preferably at 8. The pH can be adjusted by the addition of regulators, such as sodium hydroxide, borax and the like.

Other desired materials may be added to the compositions as desired. This includes fillers, such as clay, asbestos, wood flour, silica, powdered aluminum, titanium dioxide, calcium carbonate, iron, and the like, pigments, other resins, dyes, stabilizers, plasticizers and the like.

The above-described compositons may be utilized in greater variety of different applications. As indicated above, they may be used as water-soluble sizing agents for textiles, yarns, fibers and the like, as adhesives for the bonding particularly of cellulosic materials together and as surface coatings for various types of surfaces and particularly those derived from cellulose. In the case of the water-sizing agents, the compositions may be diluted with water and the textile materials passed into and through the aqueous solution as according to conventional procedure and then removed and dried. In the case of the coating compositions, compositions may be spread out as a thin film on the desired surfaces and allowed to dry in air.

The above-described compositions are suitable for use as adhesives in the bonding of cellulosic materials such as laminated paper board and corrugated paper board. Laminated paper board is produced commercially by adhesively combining two or more smooth surfaced strips of paper in a continuous process. The manufacture of corrugated paper board is similar, except that at least one of the strips of paper is corrugated and is joined to the adjacent strip or strips of paper only at the tips of the corrugations. In both applications, the compositions of the invention may be applied to the proper surface or surfaces of the paper and the paper sheets placed together and cured under conventional temperature and pressures, e.g., temperatures of 75 to 175° C. and contact pressure.

The application can be made by any suitable means, such as spreading with a doctor blade, spraying, dipping, painting and the like. One or both of the surfaces to be bonded may be treated in this manner. In general, it is preferred to merely apply the solution to one surface and superimpose the other surface thereon.

The thickness of the adhesive layer may vary over a wide range. In general, it is preferred to utilize a layer carying from 0.0005 to 0.1 inch thick.

After the adhesive has been applied and the sheets assembled together and pressure applied to secure the bond, the assembly may be allowed to set to cure the bonding material. The curing may be allowed to take place at room temperature, or heat may be applied to hasten the cure. Preferred temperatures range from about 20° C. to about 100° C. Pressures employed may vary from about 25 p.s.i. to 1000 p.s.i.

The adhesive may be used to bond two sheets together or a multiple layer of sheets such as in plywood. The multi-sheet laminated products are preferably prepared by assembling a lay-up of a plurality of sheets of the fibrous material impregnated with the above-noted adhesive composition, placing the assembly in a press and applying heat and pressure with the aid of the press. Especially with planar cloth laminates, it is helpful in attaining best strengths in all directions to have alternate layers of the material placed at 90° angles from the direction of weave. The assembly of superimposed and impregnated sheets can be cured at elevated temperatures and pressures. Moderate pressures are effective to secure smooth surface laminates such as up to 50 pounds per square inch but higher pressures may be employed if desired.

The laminated products can be prepared as flat sheets or in cured shapes. The form of the press platens will determine the shape of the finished laminate. Thus, curved products can be prepared by use of press platens that are arc-shaped or otherwise curved in one direction as well as platens with double curvature like a segment of a sphere.

The adhesive compositions of the present invention can be used for the bonding of a great variety of different materials, such as those which are fibrous, porous or impervious. Examples of such materials include, among others, wood, glass, glass cloth, fabrics, paper, plaster of paris, metals and the like. Particularly preferred materials are the cellulosic materials as wood, paper and cellulosic fabrics as cotton. Results obtained from wood-to-wood bonding as in the preparation of particle board, plywood, and the like, are particularly outstanding. Other important applications include the bonding of paper to wood surfaces as the bonding of kraft paper to lumber surfaces.

The compositions of the invention are particularly valuable in the preparation of coating compositions. Heretofore, starch alone has been used quite extensively as a binder for pigments and the like because of its ease of preparation and availability. However, such starch coatings are not water-resistant as noted above, and a greater quantity of starch than casein is needed to bond pigments to the coated stock. Moreover, the adhesiveness of the starch is somewhat limited and the bonding film may be changed by reason of shrinking and separation due to retrogradation of the starch. Because of these difficulties starch has been somewhat limited to use under acid conditions in the coating field.

As noted above, when the products of the present invention are employed, one obtains coatings which have good water resistance, good adhesion and there is no retrogradation of the starch.

The compositions of the invention may be used in a coating composition by mixing it with a suitable quantity of a filler and a dispersing agent in an aqueous medium. Any suitable or conventional filler used in coating compositions, such as, for example, clay, $TiO_2$, $CaCO_3$ may be used. Similarly, any suitable dispersing agent conventionally used for dispersing the clay in coating compositions may be used. The type of starch which is used in this application will depend to some extent upon the type of coating desired. For example, a roll coating requires a starch of higher viscosity than does a brush coating. Consequently, a less modified starch or one of higher solids content is used for the roll coating.

For a coating composition, for example, one may combine an oxidized starch in combination with the methylolated ureidopyrimidones and mix this with clay, water and a dispersing agent. Usually it is desirable to adjust the pH of the composition to a point suitable for satisfactory dipsersion of the clay. This point is often near the neutral point or, with certain types of clay, slightly on the alkaline side. The clay dispersion and the methylolated ureidopyrimidone may be separately dispersed in water, and the two dispersions mixed to produce the final coating composition.

Coating compositions made in accordance with the above possess improved printability, good water resistance and good adhesion to subsurfaces, such as cellulosic materials, paper, textiles, wood and the like.

To illustrate the manner in which the invention may be carried out, the following examples are given It is to be understood, however, that the examples are for the purpose of illustration and the invention is not to be regarded as limited to any of the specific materials or conditions recited therein. Unless otherwise indicated, parts are parts by weight.

EXAMPLE I

This example illustrates the use of methylolated ureidopyrimidone prepared as above to insolubilize a starch-clay mixture.

A starch solution was prepared by cooking 30 parts of starch (Corn Products No. 6781) in 100 parts of water for 30 minutes at 85° C. The solution was cooled and stirred into a clay solution prepared by dispersing clay (Hydratex S.D.) in water containing 0.3% $Na_4P_2O_7$ and 0.1% NaOH.

To the above mixture was added 5% solution of methylolated ureidopyrimidone A. The mixture was then adjusted to a pH of 7 and cured at 80° C. in vacuum overnight. The resulting product was a hard starch clay solid.

The insolubility of this solid in water was determined in the following manner: The above solid was milled to form particles of 40–100 mesh. These particles were soaked at 50° C. for about 1 hour and the extraction noted. The extraction was expressed as percent of the total solubles present (starch plus insolubilizing agent). In the above case the percent soluble was 9% as compared to 100% for straight starch and 46% for a mixture of starch and a commercially available starch-insolubilizing agent applied under the same conditions.

EXAMPLE II

Example I was repeated with the exception that concentration of the methylolated ureidopyrimidone used to mix with the starch solution was 10% insteead of 5%. In this case, the percent soluble was 5% instead of 9.

EXAMPLE III

Examples I and II were repeated with the exception that the pH of the treating solution was changed from 7 to 5, 6, 8 and 9. In each case, the percent soluble varied as noted below:

| | Percent Soluble | | | |
| --- | --- | --- | --- | --- |
| | pH 5 | pH 6 | pH 8 | pH 9 |
| Example I | 9 | 9 | 12 | 19 |
| Example II | 8 | 4 | 7 | 11 |

EXAMPLE IV

This example illustrates the use of a methylolated methyl ureidopyrimidone prepared as above to insolubilize a starch-clay mixture.

A starch solution was prepared as noted in Example I. To this mixture was added 10% solution of methylolated methyl ureidopyrinidone B prepared as noted above. The mixture was adjusted to a pH of 6 and cured at 80° C. in vacuum overnight. The resulting product was a hard starch clay solid.

The insolubility of this solid in water was determined as shown in Example I. The extraction in this case was 6% as compared to 100% for straight starch and 46% for a commercially available starch-insolubilizing agent.

EXAMPLE V

Example IV was repeated with the exception that the pH was changed to 5, 7, 8 and 9. In these cases, the extracts were 8%, 16%, and 26%.

EXAMPLE VI

Examples I and IV are repeated with the exception that the starch is replaced with a mixture of 50% starch and 50% polyvinyl alcohol. Related results are obtained.

EXAMPLE VII

Examples I and VI are repeated with the exception that the ureidopyrimidone employed is prepared by using 5.2 moles of formaldehyde instead of 4.5. Related results are obtained.

EXAMPLE VIII

A modified starch solution was prepared by cooking 140 parts of Penford Gum 280 starch in 560 parts of water for 30 minutes at 85% C. To this starch solution was added 10% by weight of methylolated ureidopyrimidone. The mixture was adjusted to pH of 7. This mixture was a colorless fluid solution which could be poured or spread on surfaces. Films spread on glass plates dried to a hard water-resistant coating.

A portion of the above-described solution was also spread on white rag paper and sheets of paper pressed together to form a laminated product. This combination was dried at 105° C. for about 5 minutees. The resulting bond was strong and had good resistance to deterioration by water.

A fiber board was made up by using the above-noted composition to glue together two strips of chip board of the type used in laminate board manufacture. The laminated fiber board produced was dried under pressure for a short time, heated to 100° C. for 30 seconds and then permitted to age. The resulting adhesive bond was strong and resistant to deterioration by water.

EXAMPLE IX

Examples I, IV and VIII are repeated with the exception that the starch is replaced with each of the following: potato starch, corn starch, rice starch, tapioca starch, cyanoethylated starch and goot starch. Related results are obtained.

EXAMPLE X

This example illustrates the use of the composition described in Example I for coating paper.

A clay slip was prepared by mixing 100 parts by weight of Georgia kaolin clay with 500 parts by weight of water in a pug mill. During the mixing, 2 parts by weight of sodium hexameta-phosphate was added.

To the 100 parts of a modified starch composition containing 5% by weight of the methylolated ureidopyrimidone as in Example I was added 15 parts of the clay slip with continuous agitation. This solution was used for the coating of paper. The coating was applied by means of a blade applicator to a 60 pound per ream ground-wood coating stock in such a manner that a coating weight of about 10 to 15 pounds per ream was obtained on the paper after it had been dried. The coating sheets were then dried by application of heat. The resulting sheet had good white appearance and good resistance to water.

EXAMPLE XI

Example I is repeated with the exception that the methylolated unreidopyrimidone employed is as follows:
1,3-dimethylol-4-ureido-6-methyltetrahydro-2-thiopyrimidone,
1,3-dimethylol-4-thioureido-6-isopropyl-tetrahydro-2-pyrimidone,
1,3-dimethylol-4-ureido-6-phenyl-tetrahydro-2-pyrimidone,
1,3-dimethylol-4-ureido-5,6-dimethyl-tetrahydro-2-pyrimidone,
1,3-dimethylol-4-(N,N'-dimethylolureido)-6-methyl-tetrahydro-2-pyrimidone, and
1,3-dimethylol-4'-(N,N'-dimethylolthioureido)-6-cyclohexyl-tetrahydro-2-pyrimidone.

Related results are obtained.

I claim as my invention:

1. A process for converting a water-soluble high-molecular-weight polymeric product containing glucose units to a product which is water-resistant which comprises mixing and reacting the said water-soluble polymeric product with from .01% to 15% by weight of the water-soluble material of a methylolated ureidopyrimidone in an alkaline medium.

2. A process for converting starch to a water-resistant product which comprises mixing and reacting the starch with from .01% to 15% by weight of the starch of a methylolated ureidopyrimidone in an alkaline medium.

3. A process as in claim 2 wherein the methylolated ureidopyrimidone has the structure

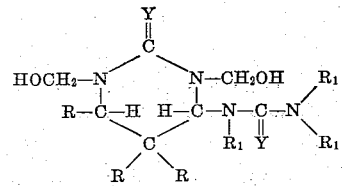

wherein Y is a member of the group consisting of oxygen and sulfur, R is a member of the group consisting of hydrogen and alkyl radicals, and $R_1$ is a member of the group consisting of hydrogen, alkyl radicals and methylol radical.

4. A process as in claim 2 wherein the reaction is conducted at a temperature between 20° C. annd 100° C.

5. A process as in claim 2 wherein the methylolated product is 1,3-dimethylol-4-ureido - tetrahydro-2-pyrimidone.

6. A composition curable to form a water-resistant product comprising a mixture of a water-soluble high-molecular weight polymeric hydroxy-containing material selected from the group consisting of polyvinyl alcohols, hydrolyzed polyvinyl acetates, starches and starch derivatives and from .01% to 15% by weight of the water-soluble material of a methylolated ureidopyrimidone.

7. A composition curable to form a water-resistant product comprising a mixture of starch and from .01% to 15% by weight of the starch of a methylolated ureidopyrimidone.

8. A composition curable to form a water-resistant product comprising a mixture of starch and from .01% to 15% by weight of the starch of 1,3-dimethylol-4-ureido-6-methyl-tetrahydro-2-pyrimidone.

9. A composition curable to form a water-resistant product comprising a mixture of starch and from .01% to 15% by weight of the starch of 1,3-dimethylol-4-ureido-tetrahydro-2-pyrimidone.

10. A process for treating paper to impart water-resistant coating thereto which comprises forming an aqueous mixture containing a water-soluble high-molecular-weight polymeric hydroxy-containing material selected from the group consisting of polyvinyl alcohols, hydrolyzed polyvinyl acetates, starches and starch derivatives and from .01% to 15% by weight of the water-soluble material of a methylolated ureidopyrimidone, impregnating the paper with this mixture and then drying the paper.

11. A process for treating paper to impart a water-resistant printable coating thereto which comprises forming an aqueous mixture containing a water-soluble high-molecular-weight polymeric hydroxy-containing material selected from the group consisting of polyvinyl alcohols, hydrolyzed polyvinyl acetates, starches and starch derivatives, clay and from .01% to 15% by weight of the water-soluble high-molecular weight material of a methylolated ureidopyrimidone, impregnating the paper with this mixture and then drying the paper.

12. A process for treating paper to impart a water-resistant coating thereto which comprises forming an alkaline aqueous mixture containing starch, from .01% to 15% by weight of the starch of a methylolated ureidopyrimidone and clay, applying this mixture to paper and then drying the paper.

13. A process for adhering surfaces together which comprises bonding the surfaces with a layer of a mixture of a high-molecular-weight polymer hydroxy-containing water-soluble material selected from the group consisting of polyvinyl alcohols, hydrolyzed polyvinyl acetates, starches and starch derivatives and from .01% to 15% by weight of the water-soluble material of a methylolated ureidopyrimidine, and allowing the mixture to set until it is cured.

References Cited

UNITED STATES PATENTS

| | | | |
|---|---|---|---|
| 2,597,872 | 5/1952 | Iler | 106—214 |
| 2,613,210 | 10/1952 | Hurwitz | 117—139.4 XR |
| 2,661,312 | 12/1953 | Richardson | 117—165 XR |
| 2,662,080 | 12/1953 | Smith | 260—256.4 XR |
| 2,935,509 | 5/1960 | Paschall | 260—233.3 |
| 3,158,501 | 12/1964 | Wayland | 260—67.5 XR |

ALEXANDER H. BRODMERKEL, *Primary Examiner.*

D. J. ARNOLD, *Examiner.*

T. MORRIS, *Assistant Examiner.*